Figure 1:
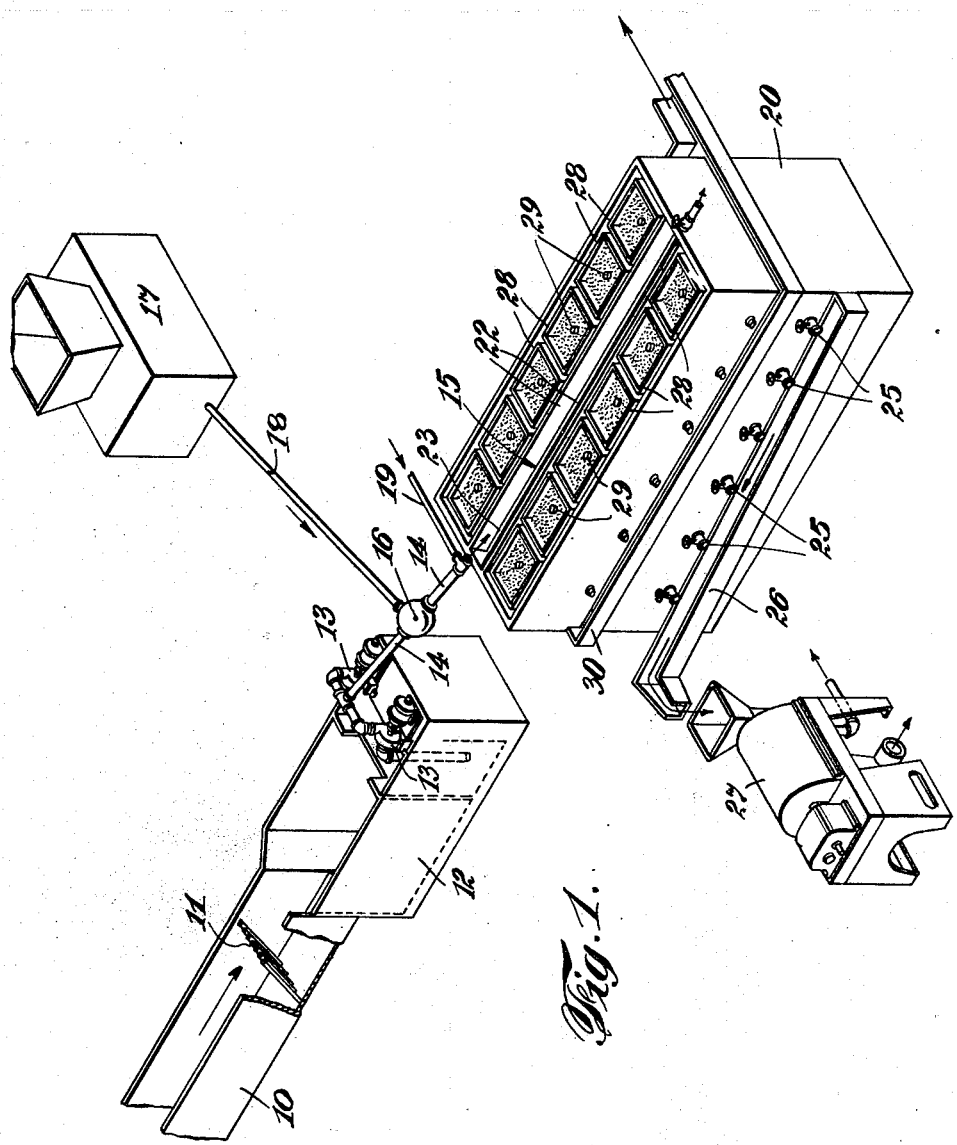

Sept. 13, 1932.  W. C. LAUGHLIN  1,877,623
METHOD FOR TREATING DOMESTIC SEWAGE
Filed Dec. 1, 1930   2 Sheets-Sheet 1

INVENTOR
William C. Laughlin
BY C.P. Goepel
his ATTORNEY

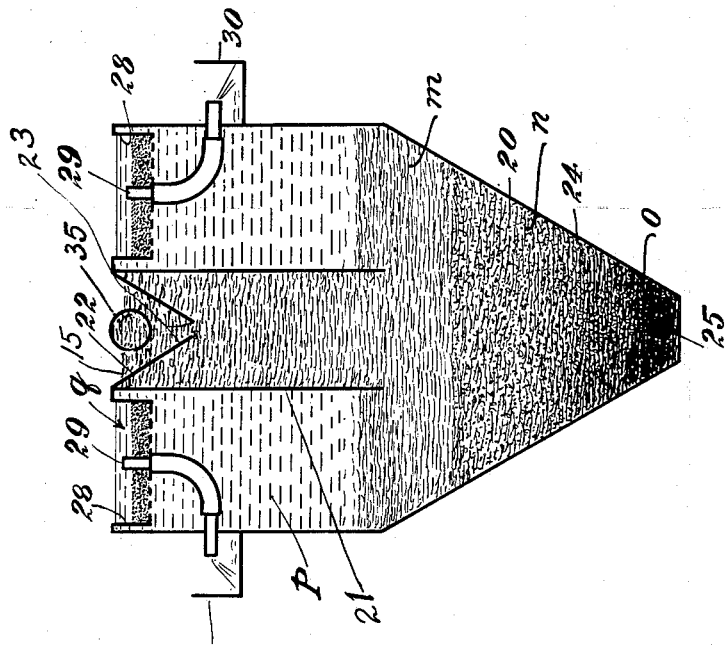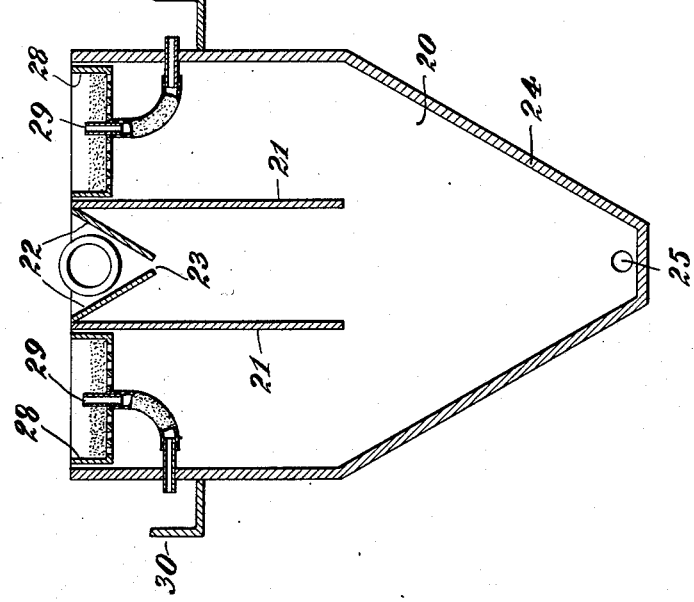

Patented Sept. 13, 1932

1,877,623

UNITED STATES PATENT OFFICE

WILLIAM C. LAUGHLIN, OF KEW GARDENS, NEW YORK, ASSIGNOR TO FILTRATION EQUIPMENT CORPORATION, OF NEW YORK, N. Y., A CORPORATION OF DELAWARE

METHOD FOR TREATING DOMESTIC SEWAGE

Application filed December 1, 1930. Serial No. 499,195.

This invention relates to the art of domestic sewage treatment. The object of the invention is particularly concerned with conditioning the solids of the sewage fluid for effecting an accumulation or aggrandizement of the otherwise untractable solids of a sewage fluid, and a separation of a clear water effluent therefrom.

The invention is a method which achieves this object, and it is carried out by subjecting the raw sewage fluid to the action of cellulose fibers beaten in water to a pulp, or in the form of a cellulose slime or gel in at least partially, if not entirely in a colloidal state until the accumulation or aggrandizement of the solids takes place to allow the same to be readily handled and the water effluent to be decanted therefrom.

The invention also utilizes the action upon each other of intermingled sewage solids in colloidal state and cellulose in colloidal state, under imbibition of water, and then utilizes the coagulation of the colloids of this intermingled disperse, whereby the coagulated colloids squeeze out the imbibed water and settle in the water, so as to be readily handled independently of the water, disposing thereby of the otherwise untractable solids of the sewage fluid. The invention enables the method of conditioning the solids to be continuously carried out, the separation of the solids of the sewage fluid and the removal thereof independently of the water effluent, being directly commensurate with the supply of the sewage fluid, differing from the prior art in the present use, which employs only intermittent methods.

The method may employ apparatus such as is shown in the accompanying drawings: Figure 1 is a perspective view, somewhat diagrammatic, of the apparatus, Figure 2 is a sectional view through the tank, indicating the probable action of its contents, and Figure 3 is a diagrammatic view similar to Figure 2, showing an assumed stratification of the material in the tank.

The supply of raw fluid sewage which has many of its solids in a colloidal or partially colloidal state enters a trough 10, preferably provided with a large mesh screen or grating 11 for separating trash, cans, etc., wherefrom the fluid preferably passes to a grit chamber 12 which serves to relieve the sewage fluid of separable grit. In certain installations, this fluid is pumped by a pump 13 through a line 14 to a launder 15 of a tank 20. This sewage fluid is mixed with water-imbibed cellulose resulting from the beatings of paper, preferably waste paper, in the presence of water. The paper is introduced into a paper beater 17, of standard construction in the paper-making art, which thoroughly disintegrates the paper under such action of the heat as is produced by the beating action in the presence of water, whereby the fibers of the paper form what is known as a cellulose slime, the cellulose being largely in colloidal condition and described by some as a colloidal gel. This has the capacity of being able to imbibe relatively large quantities of water. This pulp with or without the addition of water is then conducted by a pipe-line 18 to the sewage fluid in pipe-line 14. A chamber 16 may be provided to more completely intermingle the cellulose gel-water dispersoid throughout the sewage fluid, and the two components may be called a compound. An effective colloidal coagulant, such as ferric chloride or lime, is added to either or both of these components before or after their intermingling or after the compound has entered the tank 20. Lime could be added to the cellulose and ferric chloride to the sewage after the cellulose and lime have been added to the sewage. It has been said that coagulation of colloids causes a squeezing out of their water. The tank 20 has baffle plates 21 disposed at each side of the launder 15, formed with converging sides 22 which baffles terminate at the bottom in a feed slot 23. These baffles end intermediate the top and bottom of the tank and the tank tapers towards the bottom to form a convenient solids collector.

If the cellulose gel-water dispersoid is not thoroughly diffused throughout the sewage fluid prior to feeding through the slot 23, a more thorough diffusion and intermingling takes place in the tank 20 between the baffles 21. The mass descends in the tank while new supplies of what has been called a compound are fed thereto until the fluid mass fills the lower part of the tank and rises in the tank along both the outer sides of the baffle walls. During this mass movement there is a thorough intermingling of the sewage fluid, having its solids largely in colloidal state, and of the cellulose gel or colloidally conditioned fibers, and the sewage colloids and colloidal gel having jointly imbibed large quantities of water, in this water-permeated state readily join and intermingle and enmesh, and entangle whatever sewage solids are present, whether colloidal or suspended, and form, so to say, a homogeneously distributed gel or slime-like strata of cellulose and sewage solids. This, of course, requires some time. Under the action of whatever coagulating medium is present in the mass it is believed that the colloids of both constituents then give up their imbibed water whereupon the coagulated colloids including the solids of the sewage, having a higher specific gravity than the water settle downwardly to the bottom of the tank, and the lighter water rises in the tank towards the outlets 30 thereof.

It is believed that a certain proportion of the cellulose fibers either in a partially colloidal or non-colloidal state act mechanically as a sieve or screen to adsorb certain solids as well as any oils or greases which may be present in finely divided state in the sewage. Also, it is known that relative to water, paper pulp fibers descend and so tend to accumulate towards the bottom of the tank, thereby making denser strata. It is believed that certain of the cellulose fibers function to pick up bacteria from the sewage. In addition, the strata of cellulose takes any other solids to the bottom in view of the viscosity thereof or the comparatively large surface tension is sufficient to overcome any buoyant tendencies of the solids. The degradation of the colloids of the sewage and cellulose also serves towards separation of water therefrom with the simultaneous gripping of the solids, and with the solids being adsorbed, they descend in the tank. The bacterial action upon the colloids also serves towards their degradation. Part of all of these manifold actions take place in the presence of others not enumerated during the time the fluid mass moves from the entrance of the tank until disassociation of the water of the supplied sewage fluid takes place, leaving the solids to be readily handled. These actions take place during what may be called the sedimentation period, usually about three hours. In the embodiment shown the tank is maintained full during the operation, whereby the action of fluid pressure is availed of to assist in the operations carried out, but this feature is not of the essence of this invention.

Due to the actions and reactions above described, which are chemical, physical, mechanical, colloidal, and perhaps biological in nature, the solids are agglomerated and accumulated in the bottom of the tank in a way in which they can be readily handled and are drawn off by the discharge 25 in a comparatively thick fluid mass containing about two per cent solids, into a trough 26 which conveys them to a suitable standard vacuum filter 27. This filter solidifies the solids into a composition characteristically solid which contains about sixty-five percent solids and which may be disposed of for subsequent utilitarian purposes.

The liquid portion of the mass is gradually clarified as it reaches the top of the tank 20 on the outer sides of the baffles 21, and passes through removable mechanical filters shown at 28. These may be of the usual sand type but I prefer filters which include a layer of magnetite which functions to collect whatever solids in suspension or bacteria that remains. The effluent is drawn off by overflow pipes 29 and discharged into an overflow launder 30 which passes the effluent to any desired point of disposal. The effluent is practically free from solids and bacteria and may be discharged into flowing streams without danger of pollution or used for irrigation purposes. If the above continuous method is carried out under normal operating conditions sedimentation takes place in about three hours and thereafter continues commensurate with the inflow of the sewage fluid and the outflow of the effluent and discharge of the solids.

The effluent may also be treated by subjecting it to any of the well-known chlorination processes which serve not only to further the effluent but to supply additional oxygen thereto which causes a change of the nitrite constituents to harmless nitrates.

When it is considered that a million gallons of sewage fluid contain anywheres up to a ton of solids in a finely divided state with the solids representing approximately five two-hundredths of one per cent of the sewage fluid, and the added cellulose which may range anywheres up to 320 pounds per million gallons, and constitute about one two-hundredths of one per cent, and a conditioning of the solids when they are drawn off to the extent of two per cent of solids, is effected by this method, the aggrandizing or solids accumulating effect brought about by this invention is clearly evident.

The effluent from the method thereof contains up to about 40 pounds of solids, which represents about five ten-thousandths of one per cent of the effluent fluid, which is about the percentage of solids present in ordinary pure water.

The cellulose slime or gel above described as obtained from waste paper which includes such discarded paper as newspapers, wrapping paper, paper boxes and cardboard, etc. separately or intermixed, is, of course, the cheapest form presently obtainable. Cellulose slime or gel may of course be obtained by beating in the presence of water in a standard beater, wood, pulp, cotton, lintels, rag pulp, jute, wool, sawdust, vegetable fibers, and similar material containing a large portion of cellulose.

I have described the manner in which my invention may be carried out in practice, and in doing so have availed myself of the use of a commercial form of apparatus which forms no part of this invention, it being separately covered by patent applications. My invention may be carried out in other apparatus, as for instance in an ordinary barrel or pail the sewage fluid could be intermingled with the cellulose slime or gel of a paper blotter, and after due time the solids will accumulate at the bottom and the clear water effluent could be decanted. Lime or ferric chloride, or both, could be added.

From the mode of operation described it has been seen that the invention disclosed comprises a novel method of sewage conditioning which consists in simultaneously supplying the sewage fluid to be treated, while discharging the clear effluent and the aggrandized solids in separated state, each separately utilizable and freed from the sewage fluid holding these constituents in combined state. The action is continuous in that as to the extent to which the mixture of sewage solids, fluids, and colloidal cellulose gel water enter the inlet of the tank, and solids pass out at the bottom of the tank and the clear effluent at the top. Also the invention comprises the novel method of subjecting the sewage fluid (largely in solid colloidal or suspended state) to quantities of a cellulose gel obtained from beating paper or paper waste in the presence of water and allowing the mixture to separate out the clear water effluent and the solids in a form which enables the latter to be readily handled. Also, the invention comprises the novel method of subjecting the colloids of sewage and of the cellulose gel to an intermingling during imbibition of water and then coagulating the colloids under expulsion of water whereby the imbibed water separates from the remaining mass. Other aspects appear from the foregoing.

While it is not possible to definitely set forth the exact nature and locality of the actions of the cellulose slime and sewage solids in the tank, these are believed to take place somewhat as follows:— After the fluid (embodying the sewage solids and cellulose slime) enters the launder 15 from the opening 35 it passes through the slot 23 down between the baffles 21 and spreads out with a sort of diffusing action. The fluid in this condition is represented in Fig. 3 in the mass bearing the reference character $m$. The colloidal cellulose and sewage solids are, of course, affected to cause coagulation and the coagulated particles form and settle out as shown in the strata designated $n$. These are accumulated or concentrated at the lower portion of the tank as shown at $o$ in the 2% solids, fluid which is drawn off through the opening 25.

The clearer fluid without the solids passes upwardly on the outer sides of the baffles 21 and gradually gets clearer towards the top of the tank as shown at $p$. After this comparatively clear fluid passes through the filters 28 it is in the form of the clear effluent $q$ which is drained off at 29. It will be noted that this operation as indicated in Figure 3, is largely a diffusion of fluids, in contrast to circulation, and by virtue of the complete fullness of the tank a molecular transmission of pressure effects, but this invention is not intended to be confined thereto.

The solids in their accumulated condition, together with the fluid associated therewith are believed to be an emulsion, or in the nature of an emulsion. Undoubtedly there is also a liquid plus liquid emulsion. Also the hydrophyllic or hydrated colloids assist in bringing about an emulsion. The emulsion may also be characterized by the intermingled or emulsified state of the colloidal cellulose and sewage solids among themselves, as well as in the fluid. This so-called emulsion is substantially stable under normal conditions. The more or less solid cake obtained after the vacuum filter has caused it to be pressed in shape, is substantially waterproof since when placed in water at room temperature the cakes will not go into solution for several days, which may be attributed to the coagulation of the colloids; which may be irreversible.

By sewage is meant domestic sewage, that is the spent water supply of a community together with those human and household wastes which are removed by water carriage, supplemented in some instances by street washings.

I claim:—

1. In the treatment of domestic sewage, the method of accumulating suspended material in the mass of the sewage fluid which consists in adding hydrated cellulose slime to the sewage, and then allowing it to diffuse through the body of the sewage mass until agglomeration and deposit of the matter suspended in the sewage fluid takes place, under separation of substantially sewage-free water.

2. In the treatment of domestic sewage, the method of effecting an accumulation of the solids of sewage fluids which consists in subjecting the sewage fluid to the action of water-infused gelled cellulose, to form a coagulum with the accumulated solids in the fluid, thereby obtaining a substantially clear effluent.

3. In the treatment of domestic sewage, the method of conditioning the sewage for individual handling of the solids and remaining effluent which consists in subjecting a mass body of sewage fluid to the action of hydrated cellulose slime and allowing said slime to diffuse through the mass body of said fluid, and detain the intermingled solid mass to permit accumulation of the solids and cellulose slime for separating off the accumulated solids to leave an effluent, and disposing of the effluent independently of the solids.

4. In the treatment of domestic sewage, the method of subjecting sewage fluid to the action of hydrated cellulose slime in a colloidal state in the area of the mass body of said sewage fluid within a container, intermingling the sewage fluid mass with the cellulose mass throughout the area of said mass body to bring about a mass diffusion, and detaining the sewage fluid and slime in contact until agglomeration of the colloids of the slime and the sewage under water expulsion takes place and the resultant agglomerate gravitates to the bottom of a container thereof whereby the agglomerated solids and effluent are separated, the supernatent adjacent area around said central area comprising the effluent which is drawn off at the top of the agglomerated solids, said agglomerated solids being separately removed.

5. In the treatment of domestic sewage, the method of subjecting the mass of colloidal solids of a sewage fluid to mass hydrated colloidal cellulose, and then coagulating the colloids by diffusion of the colloidal solids and the colloidal cellulose, the intermingling of the solids and cellulose bringing about a water imbibition of the colloids thereof and a water expulsion of the same in the combined colloids, whereby a separation of the solids from the effluent is effected.

6. In the method of treating domestic sewage, the steps consisting of adding a gelled cellulose slime to the sewage mass, allowing the slime to diffuse through said mass, to agglomerate the matter suspended therein and gravitate the resulting agglomerate to the bottom of the sewage mass, decanting the water of the agglomerate, and collecting the agglomerate and subjecting it to a drying out process whereby a porous solid is obtained.

7. In the treatment of domestic sewage, the continuous method of accumulating the solids of the sewage fluid mass for individual handling of the solids and the effluent, which consists in continuously subjecting the sewage fluid mass to the action of a cellulose slime diffusing the slime throughout the sewage fluid mass to permit the formation of an aggregate body, while simultaneously and independently separating the accumulated solids and the effluent from the sewage fluid, the continuous separation taking place during commensurate supply of the sewage fluid.

8. In the method of treating domestic sewage, the steps consisting of subjecting a million gallons of sewage fluid containing about one-fortieth of one percent of solids, to the action of a hydrated cellulose slime constituting about two-one-hundredths of one percent of the total sewage fluid, to form an accumulation of the solids in the sewage fluid, thus conditioning the same, and then separating the deposited accumulated solids while drawing off the resultant clear effluent.

9. In the method of treating domestic sewage, the steps consisting of adding a gelled cellulose slime to the sewage mass, adding a coagulant, allowing the slime to diffuse through said mass to agglomerate the matter suspended therein and gravitate the resulting agglomerate to the bottom of the sewage mass, decanting the water of the agglomerate, and collecting the agglomerate, and finally subjecting it to a drying out process whereby a porous solid is obtained.

10. In a method of treating sewage for separating suspended solids, colloidal and organic putrescible matter therefrom, and obtaining a clear effluent, the step which consists in adding to said sewage, hydrated fluid pulp of cellulose material to agglomerate the matter with the hydrated fluid pulp, allowing the agglomerate to stand, decanting a resultant substantially clear effluent, and then removing the solids separately therefrom.

In testimony that I claim the foregoing as my invention, I have signed my name hereto.

WILLIAM C. LAUGHLIN.